(12) United States Patent
Kurikka et al.

(10) Patent No.: US 9,964,016 B2
(45) Date of Patent: May 8, 2018

(54) EXHAUST GAS AFTERTREATMENT DEVICE

(71) Applicant: Proventia Emission Control Oy, Oulunsalo (FI)

(72) Inventors: Jukka Kurikka, Liminka (FI); Tuomas Tyni, Liminka (FI)

(73) Assignee: PROVENTIA EMISSION CONTROL OY, Oulunsalo (FI)

( * ) Notice: Subject to any disclaimer, the term of this patent is extended or adjusted under 35 U.S.C. 154(b) by 174 days.

(21) Appl. No.: 14/895,003

(22) PCT Filed: Jun. 2, 2014

(86) PCT No.: PCT/FI2014/050443
§ 371 (c)(1),
(2) Date: Dec. 1, 2015

(87) PCT Pub. No.: WO2014/195576
PCT Pub. Date: Dec. 11, 2014

(65) Prior Publication Data
US 2016/0115848 A1  Apr. 28, 2016

(30) Foreign Application Priority Data
Jun. 3, 2013 (FI) ..................................... 20135612

(51) Int. Cl.
*F01N 3/10* (2006.01)
*F01N 3/28* (2006.01)
(Continued)

(52) U.S. Cl.
CPC ........... *F01N 3/2892* (2013.01); *B01D 53/92* (2013.01); *B01D 53/944* (2013.01);
(Continued)

(58) Field of Classification Search
CPC .. F01N 3/2892; F01N 3/2066; F01N 2240/20; F01N 2610/02; B01F 5/0451; B01F 5/0498
(Continued)

(56) References Cited

U.S. PATENT DOCUMENTS 6,722,123 B2   4/2004 Liu et al.
2010/0263359 A1  10/2010 Haverkamp et al.
(Continued)

FOREIGN PATENT DOCUMENTS

DE   102009031502 A1   2/2010
DE   102011120685 A1   7/2012
(Continued)

OTHER PUBLICATIONS

European Patent Office, Extended European Search Report issued on EP14807361.2, dated Mar. 20, 2017.

*Primary Examiner* — Tom P Duong
(74) *Attorney, Agent, or Firm* — Berggren LLP

(57) ABSTRACT

The aftertreatment device has a casing (10), which has an inlet opening (12) for the inflow of the exhaust gas, an outlet opening (14) for the outflow of the exhaust gas and a feed hole (16) for dispensing reactive substance to the casing. The reactive substance can be for example fuel, ammonium or urea/water solution. As an extension of the outlet opening there is a mixing tube (18) directed outwards from the casing for mixing the exhaust gas and the reactive substance. Inside the casing there is a feeding channel (20) for guiding the exhaust gas to the mixing tube. The feeding channel has an open first end extending to the outlet opening, the cross-sectional area of which first end is smaller than the cross-sectional area of the outlet opening. The wall (22) of the feeding channel has holes (24) for the inflow of the exhaust gas. Preferably, the wall of the feeding channel has at least along a part of its length a conical shape. The second end of
(Continued)

Figure 1A:
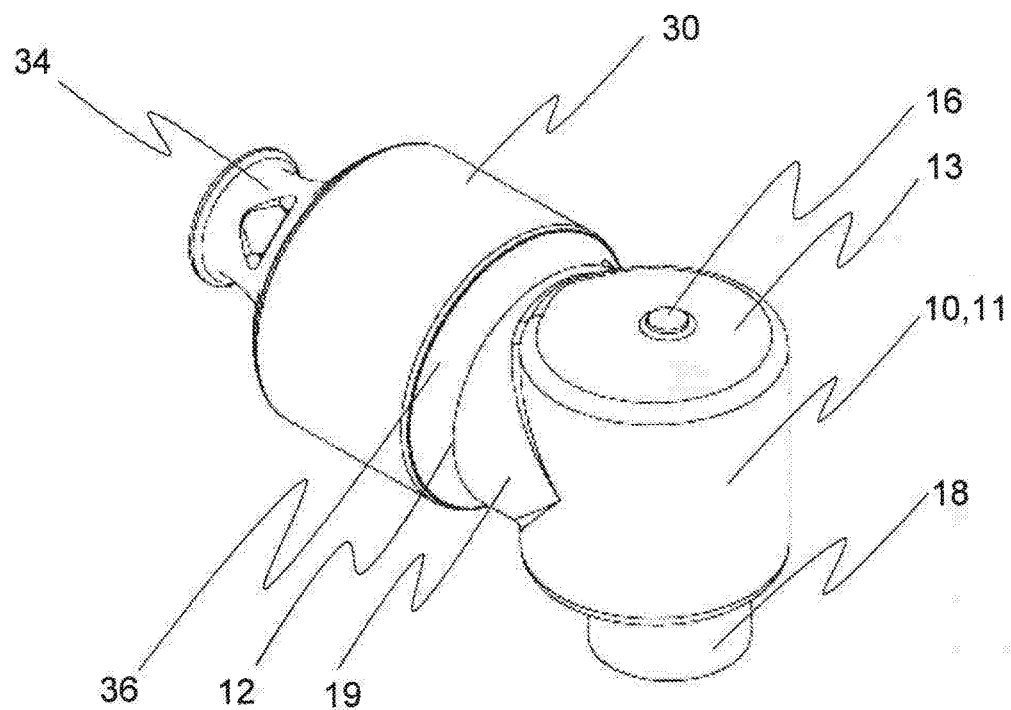

the feeding channel can be connected to the end wall of the casing, whereby the exhaust gas can flow into the feeding channel only through the holes in the wall of the feeding channel. The exhaust gas can flow to the mixing tube through the feeding channel as well as through the annular slot around the first end of the feeding channel. The exhaust gas flowing through the feeding channel forms a center flow to the mixing tube and the exhaust gas flowing through the slot surrounding the feeding channel forms an edge flow surrounding and rotating around the center flow.

15 Claims, 3 Drawing Sheets

(51) Int. Cl.
| | |
|---|---|
| *B01F 5/00* | (2006.01) |
| *B01F 5/04* | (2006.01) |
| *B01F 3/04* | (2006.01) |
| *F01N 3/20* | (2006.01) |
| *B01D 53/92* | (2006.01) |
| *B01D 53/94* | (2006.01) |

(52) U.S. Cl.
CPC ........ *B01F 3/04049* (2013.01); *B01F 5/0065* (2013.01); *B01F 5/0451* (2013.01); *B01F 5/0498* (2013.01); *F01N 3/2066* (2013.01); *F01N 2240/20* (2013.01); *F01N 2610/02* (2013.01); *Y02T 10/24* (2013.01)

(58) Field of Classification Search
USPC ........................................ 422/176, 177, 180
See application file for complete search history.

(56) References Cited

U.S. PATENT DOCUMENTS

| | | | |
|---|---|---|---|
| 2011/0061374 A1 | 3/2011 | Noritake | |
| 2011/0094206 A1 | 4/2011 | Liu et al. | |
| 2011/0308234 A1* | 12/2011 | De Rudder | ......... B01F 3/04049 |
| | | | 60/295 |
| 2012/0020854 A1 | 1/2012 | Makartchouk et al. | |

FOREIGN PATENT DOCUMENTS

| | | |
|---|---|---|
| EP | 1770253 A1 | 4/2007 |
| EP | 2314837 A1 | 4/2011 |
| EP | 2465602 A2 | 6/2012 |
| FR | 2957119 A1 | 9/2011 |
| WO | 2012044233 A1 | 4/2012 |
| WO | 2013178321 A1 | 12/2013 |

* cited by examiner

EXHAUST GAS AFTERTREATMENT DEVICE

PRIORITY

This application is a U.S. national application of international application number PCT/FI2014/050443 filed on Jun. 2, 2014 and claiming priority of the Finnish national application FI 20135612 filed on Jun. 3, 2013, the contents of both of which are incorporated herein by reference in their entirety.

The invention relates to an exhaust gas aftertreatment device, which comprises a casing, which casing has an inlet opening for the inflow of the exhaust gas, an outlet opening for the outflow of the exhaust gas, a feed hole for dispensing reactive substance to the casing, a mixing tube extending from the outlet opening for mixing the exhaust gas and reactive substance and a feeding channel for guiding the exhaust gas to the mixing tube, which feeding channel has an open first end directed to the outlet opening, the cross-sectional area of which first end is smaller than the cross-sectional area of the outlet opening.

A technique, where nitrogen oxides are transformed into harmless compounds with the aid of a reactive substance to be mixed into the exhaust gas and a catalyser, is used for reducing NOx emissions of the exhaust gasses from diesel engines. SCR (Selective catalytic reduction) technique uses for example a urea/water mixture as a reactive substance, which mixture is fed in small drops to the exhaust gas. Under the influence of the heat of the exhaust gas the water in the urea/water mixture is vaporized and the urea is disintegrated into ammonia, which reacts in the SCR catalyser with the nitrogen oxides. Pure nitrogen and water is generated as a final result of the reaction.

The disintegration of urea into ammonia occurs in several stages and different intermediate products can be generated in the process, which intermediate products can precipitate in the urea injection site or in the spots of the exhaust gas passage following the injection site. Too low surface temperatures of the exhaust gas passage, insufficient vaporizing time of urea before ending up in the catalyser, and bends in the exhaust gas passage, where the urea drops collide with the walls, increase the formation of precipitates. Precipitates can accumulate in the exhaust gas passage to such an amount that they weaken the flow of the exhaust gas and increase the counter pressure in the engine too high. The precipitates also decrease the distribution of the reactive substance in the exhaust gas passage, which decreases the efficiency of the SCR system.

In order to ensure the vaporization of the urea the injected urea should mix as well as possible with the exhaust gas without colliding with the walls of the exhaust gas passage. Additionally, the temperature of the exhaust gas should be sufficiently high and the distance between the injection site and the catalyser should be sufficiently long. In practice, the dimensions of the vehicles and the placement of the engine set their own limits for the structure of the exhaust gas passage, which makes it more difficult to optimally arrange the urea feeding.

The publication EP 1770253 discloses a cleaning device for the exhaust gas, in which cleaning device the exhaust gas flow is divided into a centre flow and an edge flow circulating the centre flow. The reactive substance, such as urea/water solution, is fed to the centre flow, whereby it stays in the mixing tube separated from the wall of the mixing tube as long as possible. With this known solution, good cleaning results of the exhaust gas are achieved, while the amount of precipitations remains small. Along with the gradual tightening of the limit values for exhaust gas emissions there is still a great need for the continuous improvement of the aftertreatment devices.

It is an object of the invention to provide an exhaust gas aftertreatment device, by which the disadvantages relating to the prior art can be reduced and better cleaning results can be achieved.

The objects of the invention are obtained with an aftertreatment device, which is characterized by what is presented in the independent claim. Some advantageous embodiments of the invention are presented in the dependent claims.

The invention relates to an exhaust gas aftertreatment device, which is especially suitable for cleaning the exhaust gas from diesel engines. The aftertreatment device has a casing, which has an inlet opening for the inflow of the exhaust gas, an outlet opening for the outflow of the exhaust gas and a feed hole for dispending reactive substance to the casing. The reactive substance can be for example fuel, ammonium or preferably urea/water solution. The feed hole can be a nozzle or an injector, through which the reactive substance is sprayed with a desired spraying pattern into the casing, or the feed hole can be a through mounting hole, to which the actual spraying nozzle or injector for the reactive substance is mounted. As an extension of the outlet opening there is a mixing tube directed outwards from the casing for mixing the exhaust gas and the reactive substance. Inside the casing there is a feeding channel for guiding the exhaust gas to the mixing tube. The feeding channel has an open first end directed to the outlet opening, the cross-sectional area of which first end is smaller than the cross-sectional area of the outlet opening. The first end of the feeding channel can extend as far as to the outlet opening or it can extend to a distance from the outlet opening. The exhaust gas can flow to the outlet opening through the feeding channel through the open first end of the feeding channel as well as through the annular slot around the first end of the feeding channel. The exhaust gas flowing through the feeding channel forms a centre flow to the mixing tube and the exhaust gas flowing through the slot surrounding the feeding channel forms an edge flow surrounding the centre flow. The aftertreatment device is characterized in that said feeding channel has a wall, which wall has holes for the inflow of the exhaust gas. It has been observed that by guiding the exhaust gas into the feeding channel through the small holes in the wall, a relatively steady flow is formed inside the feeding channel. By using sufficiently small round holes, e.g. having a diameter of 3 mm, in the wall of the feeding channel and by locating them in the wall of the feeding channel appropriately, the wall of the feeding channel can be made to function as a flow equalizer, with which a nearly laminar exhaust gas flow rotating around the central axis of the feeding channel is formed inside the feeding channel.

In a preferred embodiment of the aftertreatment device according to the invention the casing has an outer jacket, a first end wall and a second end wall, wherein the feed hole for feeding the reactive substance is located in the first end wall and the outlet opening is located in the second end wall. The feeding channel is located in the outer jacket so that the feed hole is directed into the feeding channel. The reactive substance, such as urea/water solution, to be dispensed through the feed hole into the casing, is thus directed into the feeding channel, where it starts to mix with the exhaust gas present in the mixing tube. The reactive substance is passed with the exhaust gas flowing through the feeding channel through the outlet opening to the mixing tube, where the final mixing of the reactive substance with the exhaust gas occurs.

In another preferred embodiment of the aftertreatment device according to the invention the feeding channel has a second end, the cross-sectional area of which second end is unequal to the cross-sectional area of the first end. Thus, the cross-sectional area of the feeding channel does not remain constant along the entire length of the feeding channel. Preferably the wall of the feeding channel has at least along a part of its length a conical shape. The cross-sectional area of the first end of the feeding channel can be smaller than the cross-sectional area of the second end. In case of a conical feeding channel this means that the feeding channel contracts towards the outlet opening. Alternatively, the cross-sectional area of the first end of the feeding channel can be bigger than the cross-sectional area of the second end. In case of a conical feeding channel this alternative means that the feeding channel extends towards the outlet opening.

In a third preferred embodiment of the aftertreatment device according to the invention the second end of the feeding channel is substantially connected to the first end wall of the casing. In practise, the first end wall thus closes the second end of the feeding channel, whereby the exhaust gas can flow into the feeding channel only through the holes in the wall of the feeding channel.

In still another preferred embodiment of the aftertreatment device according to the invention the cross-sectional area of the first end of the feeding channel is substantially smaller than the cross-sectional area of the mixing tube. The edge flow of the exhaust gas flowing between the edge of the outlet opening and the wall of the feeding channel has thus room to flow in the mixing tube around the centre flow coming through the feeding channel, whereby these flows remain in the mixing tube as "separate" flows as long as possible. Preferably the first end of the feeding channel extends through the outlet opening into the mixing tube. The point of discontinuity of the edge flow formed immediately to the place of the outlet opening to the starting point of the mixing tube cannot thus influence on the centre flow coming through the feeding channel. The cross-sectional area of the flowing route of the edge flow coming from the casing to the mixing tube is reduced when the exhaust gas flow is transferred from the inside of the casing to the mixing tube. As a result, the flow velocity of the edge flow increases remarkably. The edge flow flowing in the mixing tube has thus a high flow velocity and a gentle angle of elevation of the spiral of the flow.

In yet another preferred embodiment of the aftertreatment device according to the invention the feed hole is located to the first end wall substantially on the imaginary central axis of the feeding channel. The spraying pattern of the reactive substance to be dispensed to the feeding channel through the feed hole is thus directed in the direction of the central axis of the feeding channel, what is appropriate in the case of the symmetrical spraying pattern. If the spraying pattern of the reactive substance is asymmetrical, the feed hole does not necessarily need to be located on the central axis of the feeding channel.

Yet another preferred embodiment of the aftertreatment device according to the invention has a swirl structure for guiding the exhaust gas led into the casing to rotate around the feeding channel in one direction of rotation. The rotating nature of the exhaust gas flow remains when the exhaust gas flows from the inside of the casing from the slot between the edge of the outlet opening and the wall of the feeding channel to the mixing tube, i.e. the edge flow flowing in the mixing tube has a spirally advancing flowing pattern rotating along the walls of the mixing tube.

Due to the swirl structure the exhaust gas rotates around the feeding channel in one direction of rotation and a part of the exhaust gas travels through the holes in the wall of the feeding channel into the feeding channel. The rotating movement of the exhaust gas flow is remarkably reduced when travelling through the wall of the feeding channel, so the exhaust gas flowing inside the feeding channel can in practice have a nearly laminar flow. The exhaust gas flowing through the wall has, despite of the reduction, also a remaining tangential flowing component. The centre flow led to the middle of the mixing tube through the feeding channel and the edge flow flowing around the centre flow are thus most likely both spiral flows, but they have a substantially different flow velocity and a different angle of elevation of the spiral of the flow.

The swirl structure can comprise at least one flow guide for guiding the exhaust gas flowing from the inlet opening to the casing to rotate around the feeding channel. It is appropriate to locate the flow guide in connection with the inlet opening of the casing either inside the casing or immediately outside the outer jacket of the casing. The flow guide has preferably a shape of a curved plate.

In yet another preferred embodiment of the aftertreatment device according to the invention the feeding channel is located in an eccentric manner to the casing and the edge of the inlet opening has a collar for guiding the exhaust gas flow to the widest point of the slot between the outer jacket of the casing, and the wall of the feeding channel in the direction of the tangent of the wall. With this placement of the feeding channel it is achieved that the cross-sectional area of the flowing route of the exhaust gas is reduced inside the casing while the flow is advancing around the feeding channel. The reduction of the cross-sectional area of the flow increases the pressure of the exhaust gas, what forces a part of the exhaust gas to flow through the holes in the wall of the feeding channel into the feeding channel.

Yet another preferred embodiment of the aftertreatment device according to the invention further comprises a substrate casing, inside of which an aftertreatment substrate of the exhaust gas is located. Preferably the aftertreatment substrate is a particulate filter or an oxidation catalyst, through which the exhaust gas is guided to flow. The substrate casing has an inlet pipe for the inflow of the exhaust gas and an outlet connection, which is connected to the inlet opening of the casing. Between the outlet connection and the inlet opening there is no separate connecting pipe in addition to a possible collar, but the substrate casing is in practice directly connected to the side of the casing. The flowing route of the exhaust gas from the substrate into the casing is thus made as short as possible, whereby the temperature of the exhaust gas entering to the casing remains high, what in its part prevents the formation of precipitations.

The advantage of the aftertreatment device according to the invention is that a reactive substance, such as urea/water solution, can be made to mix evenly with the exhaust gas. Thus, harmful agents in the exhaust gas can be effectively removed with the invention.

Furthermore, the advantage of the invention is that the reactive substance to be fed with the aid of it to the exhaust gas flow can be kept separated from the walls of the exhaust gas passage for a long time, what reduces the formation of harmful precipitations.

In the following, the invention will be described in detail. In the description, reference is made to the enclosed drawings, in which FIG. 1a shows by way of an example an exhaust gas aftertreatment device according to the invention seen diagonally from above, FIG. 1b shows the aftertreatment device of FIG. 1a seen from the side, FIG. 2a shows a cross-sectional view of the aftertreatment device of FIGS. 1a and 1b in the longitudinal direction of the casing, FIG. 2b shows a cross-sectional view of the aftertreatment device of FIGS. 1a, 1b and 2a in the transversal direction of the casing, and FIG. 2c shows an aftertreatment device according to the invention seen diagonally from above.

Figure 1B:
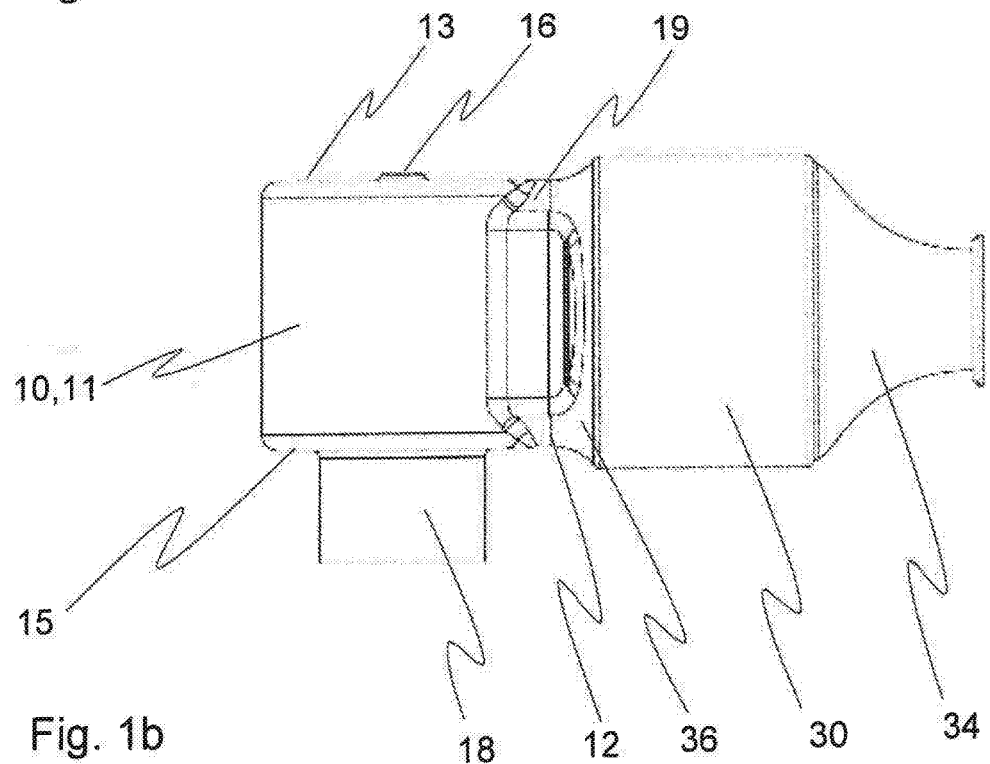

FIGS. 1a and 1b show by way of an example an exhaust gas aftertreatment device according to the invention seen from two different directions. The aftertreatment device has a casing 10, which has two round-shaped end walls, a first end wall 13 and a second end wall 15 as well as an outer jacket 11 having a cylindrical shape. The first end wall has a feed hole 16, to which a nozzle spraying a reactive substance to the exhaust gas is fixed (the nozzle is not shown in the figure). The second end wall has a mixing tube 18 directed outwards from the end wall. In FIGS. 1a and 1b the mixing tube has been illustrated as a short tube. In practice, the length of the mixing tube has not been restricted to any specific length, but its length can be chosen as desired. The side of the outer jacket has a hole slightly smaller than the diameter of the outer jacket, a fixing collar 19 surrounding the edges of which hole. The free edge of the fixing collar defines the inlet opening 12 opening into the casing.

The aftertreatment device further comprises an aftertreatment substrate of the exhaust gas, which substrate can be for example a particulate filter (diesel particulate filter) or an oxidation catalyst (diesel oxidation catalyst). The aftertreatment substrate is located in the substrate casing 30, which has a cylindrical wall. The first end of the substrate casing has a conically extending inlet pipe 34 for the inflow of the exhaust gas and the second end has an adjustment element 36, with which the substrate casing is connected from its one end to the fixing collar 19 of the casing 10. The distance between the aftertreatment substrate and the casing is thus made as short as possible, whereby the exhaust gas has no time to cool down on the way, but enters the casing having a temperature as high as possible.

Figure 2A:
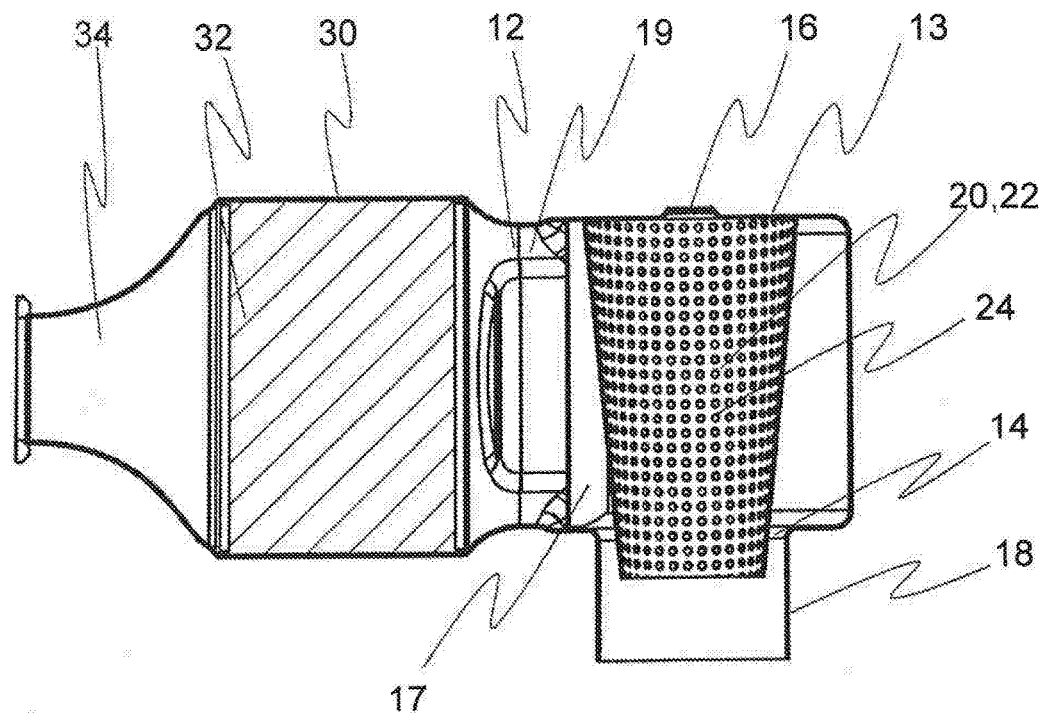
Figure 2B:
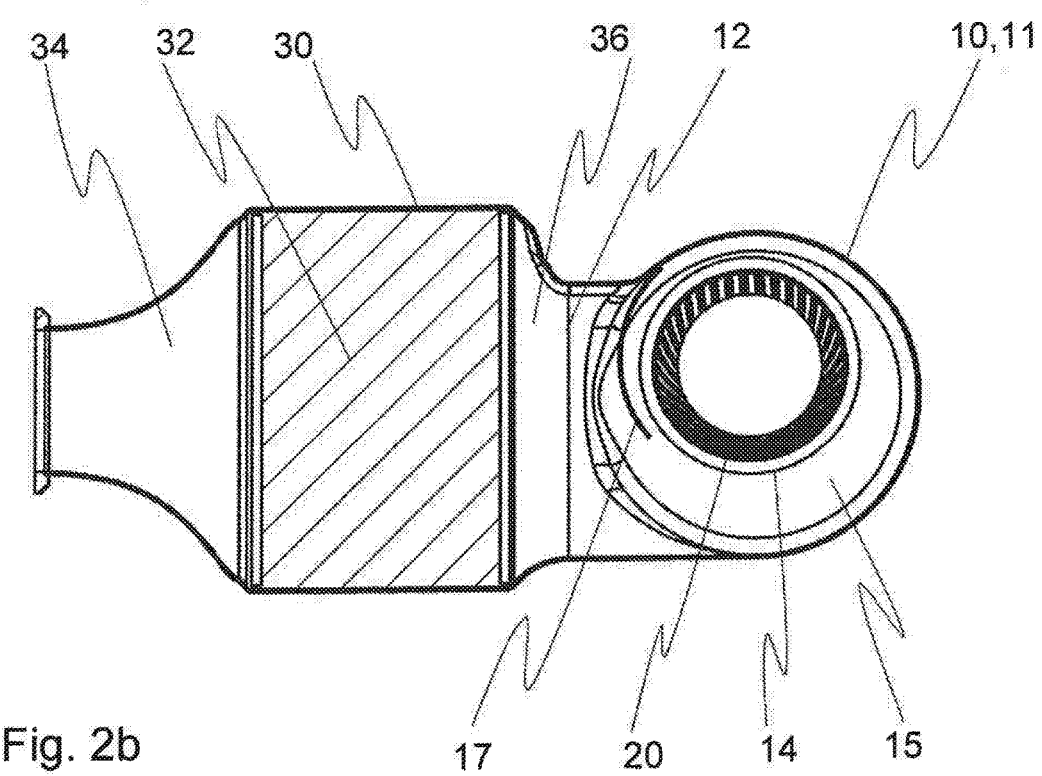
Figure 2C:
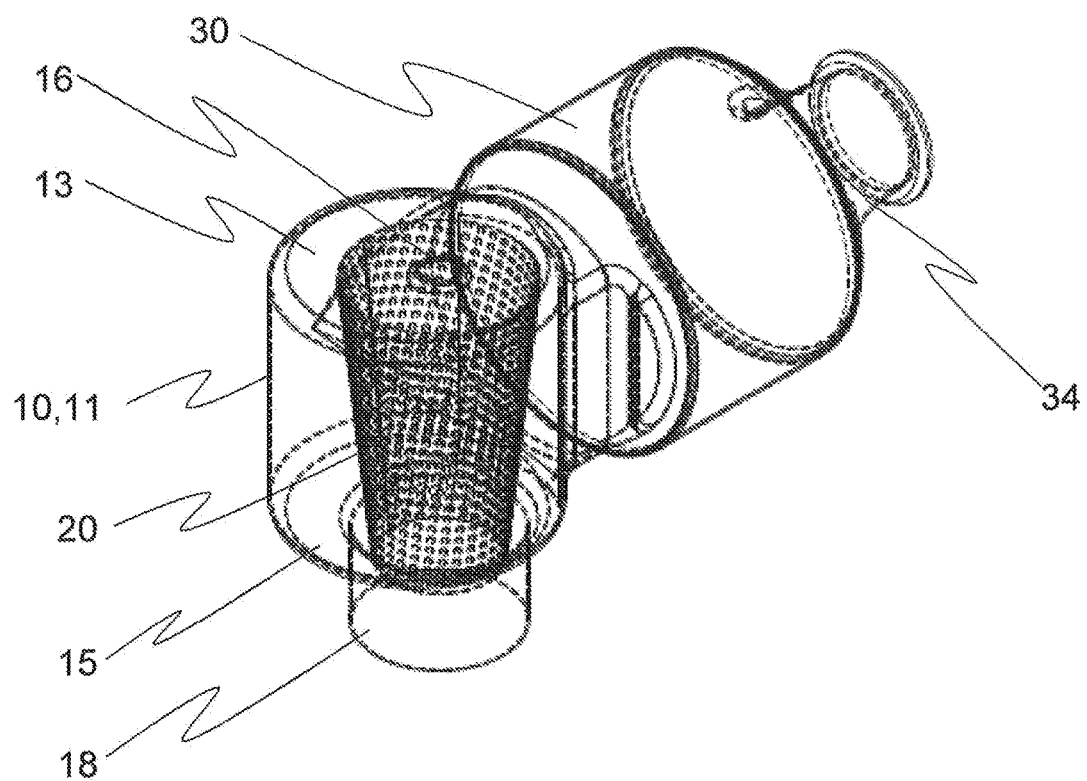

A cross-sectional view of an exhaust gas aftertreatment device in the longitudinal direction of the casing 10 of FIGS. 1a and 1b is illustrated in FIG. 2a, and the cross-sectional view of the same device is illustrated in FIG. 2b in the transversal direction of the casing. The aftertreatment device of FIGS. 2a and 2b is illustrated in FIG. 2c as seen diagonally from above, so the casing and the substrate casing are transparent. A substrate casing 30, inside of which the aftertreatment substrate 32 is located, is shown in the figures on the side of the casing. The first end of the substrate casing has an inlet pipe 34, which is connected to the exhaust gas system of a vehicle, such as to the exhaust pipe near the exhaust manifold of the engine or to the exhaust pipe of the turbocharger. The exhaust gas to be treated is thus guided through the inlet pipe into the substrate casing. The inlet pipe extends in a funnel-shaped manner in the flow direction of the exhaust gas. The aftertreatment substrate inside the substrate casing is limited in its edges to the walls of the substrate casing, so that the exhaust gas led inside of it is made, to flow through the aftertreatment substrate.

The outer jacket 11 of the casing 10 of the aftertreatment device has a fixing collar 19, the free end of which defines the inlet opening 12 opening into the casing. The fixing collar is fixed to the outlet connection 36 of the substrate casing, which outlet connection has an outlet hole equally large with the inlet opening. The exhaust gas flown through the aftertreatment substrate exits thus from the substrate casing through the outlet connection 36 and the fixing collar directly to the casing 10.

The casing 10 comprises a first end wall 13, a second end wall 15, as well as an outer jacket 11 (FIG. 2a) having a cylindrical shape. The first end wall has a feed hole 16 for fixing a nozzle feeding the reactive substance (the nozzle is not illustrated in the figure). The second end wall 15 has a round outlet opening 14, from which a mixing tube 18 having a round cross-section extends from the second end wall. The inner diameter of the mixing tube is substantially smaller than the inner diameter of the casing and substantially equally large with the diameter of the outlet opening 14.

Inside the casing there is a feeding channel 20, which has a wall 22 having a conical shape. The first end of the feeding channel 20 extends through the outlet opening 14 into the mixing tube 18. The first end of the feeding channel extends preferably 20-30 mm into the mixing tube. The diameter of the first end of the feeding channel is substantially smaller than the diameter of the outlet opening, so that an annular slot remains between the edge of the outlet opening and the wall of the feeding channel, through which slot the exhaust gas can flow from the casing to the mixing tube. The feeding channel and the mixing tube have the same imaginary central axis, so the annular slot surrounding the first end of the feeding channel has a constant width. The feed hole 16 in the first end wall is located on the same central axis of the mixing tube and the feeding channel. The first end of the feeding channel is open and the second end of the feeding channel extends so as to be connected to the first end wall 13. The wall 22 of the feeding channel 20 has holes 24 in the entire area of the wall. The holes are relatively small in their size, and they are substantially evenly distributed to the entire surface area of the wall. The holes are preferably round holes having a diameter of couple of millimeters. The holes form a flowing route of the exhaust gas from the inside of the casing into the feeding channel. The exhaust gas can exit from the feeding channel to the mixing tube through the open first end of the feeding channel. Naturally, it is possible that the exhaust gas flows also through the wall of the feeding channel through some of the holes into the feeding channel and through some other holes back outside the feeding channel. Such back flow occurring through the holes is, however, so slight that it is not significant in view of the operation of the device.

The feeding channel 20 is located in the casing 10 in an eccentric manner, i.e. the imaginary central axis of the feeding channel does not pass through the midpoints of the end walls 13, 15 of the casing. The eccentric placement results in the fact that the width of the annular space between the outer jacket 11 of the casing and the wall 22 of the feeding channel, which width has been measured in the direction of the radius of the feeding channel, varies according to the measuring point. In the place of the inlet opening 12 there is a curved flow guide 17 formed of a metal plate, which flow guide surrounds the feeding channel from a distance from the feeding channel. As seen from the direction of the inlet opening the flow guide covers the feeding channel nearly entirely out of sight. The inlet opening 12 and the flow guide 17 defined by the fixing collar 19 guide the exhaust gas to the widest point of the annular space between the wall 22 of the feeding channel and the outer jacket 11 of the casing in the direction of the tangent of the wall of the feeding channel. The exhaust gas is thus guided to the spiral flow rotating inside the casing in one direction around the feeding channel.

The eccentric placement of the feeding channel results further in the fact that the flow route of the exhaust gas between the outer jacket of the casing and the wall 22 of the feeding channel rotating around the mixing tube tapers, i.e. the cross-sectional area of the flow route of the exhaust gas reduces in the flow direction of the exhaust gas. This leads to the increase of the pressure of the exhaust gas while the flow is advancing, what makes a part of the exhaust gas to flow through the holes 24 of the walls 22 of the feeding channel 20 into the feeding channel.

In the description presented above the wall of the feeding channel is in its entire length conical and the narrower end of the feeding channel leads to the outlet opening. However, it is possible, that the feeding channel has a conical portion and a cylindrical portion, i.e. the feeding channel is only along a part of its length conical. Further, it is conceivable, that the wider end of the feeding channel can lead to the outlet opening and the narrower end can extend to the first end wall, i.e. the feeding channel can extend in the flow direction of the exhaust gas. Furthermore, it is possible that the wall of the feeding channel has holes only in a part of the surface area of the wall of the feeding channel or that the total surface area, the shape and/or the size of the holes vary in different parts of the wall of the feeding channel.

In an operating situation, a feeding system of the reactive substance such as urea/water solution, is connected to the aftertreatment device according to the invention, with the aid of a nozzle belonging to which feeding system, reactive substance is sprayed to the exhaust gas flowing in the feeding channel 20. The nozzle can be any nozzle suitable for injecting a liquid agent. Especially the nozzle and the entire feeding system for the urea/water solution can be a part of a more extensive system affecting the operation and control of the engine. The mixture of the exhaust gas and the reactive substance flowing through the feeding channel 20 to the mixing tube 18, forms the centre flow of the exhaust gas, and the exhaust gas flowing through the slot between the wall of the feeding channel and the edges of the outlet opening 14 forms the edge flow surrounding the centre flow. By feeding the reactive substance into the centre flow it is ensured that the reactive substance is evenly mixed with the exhaust gas and the passing of the reactive substance to the walls of the exhaust gas passage in a too early stage is prevented.

The urea/water solution is preferably fed with the nozzle to the exhaust gas flow in small drops. The urea included in the solution is under the influence of the heat of the exhaust gas turned into ammonia, which reacts with the nitrogen oxides (NOx) present in, the exhaust gas, whereby nitrogen gas and water are generated. This reaction occurs in the SCR catalyser located in the exhaust gas passage, which catalyser is placed in the exhaust gas passage in the flow direction of the exhaust gas below the mixing tube 18 (the SCR catalyser is not shown in the figure). The vaporization of urea, its turning into ammonia and the mixing of the ammonia with the exhaust gas take place in the mixing tube and in the part of the exhaust gas passage between the mixing tube and the SCR catalyser.

The flow guide according to the invention suits especially well to be used in the cleaning processes according to the so-called SCR technique. The invention is, however, not limited only to the SCR technique or to the usage of the urea/water solution, but the reactive substance to be injected to the exhaust gas can also be some other agent, which is desired to be mixed evenly with the exhaust gas flow and/or to remain separated from the walls of the exhaust gas passage as long as possible. The reactive substance may thus be for example a urea solution, ammonia, some hydrocarbon-based reactive substance or fuel.

Some advantageous embodiments of the aftertreatment device according to the invention have been described above. The invention is not limited to the solutions described above, but it can be applied in different ways within the scope of the claims.

The invention claimed is:

1. An exhaust gas aftertreatment device, which comprises a casing, which casing has an inlet opening for the inflow of the exhaust gas, an outlet opening for the outflow of the exhaust gas, a feed hole for dispensing reactive substance to the casing, a mixing tube extending from the outlet opening for mixing the exhaust gas and the reactive substance and a feeding channel for guiding the exhaust gas to the mixing tube, which feeding channel has a wall, which wall has holes for the inflow of the exhaust gas and an open first end directed to the outlet opening, the cross-sectional area of which first end is smaller than the cross-sectional area of outlet opening, and there is an annular slot between the edge of the outlet opening and the wall of the feeding channel.

2. The aftertreatment device according to claim 1, wherein the casing has an outer jacket, a first end wall and a second end wall, whereby the feed hole for feeding the reactive substance is located in the first end wall and the outlet opening is located in the second end wall and the feeding channel is located inside the outer jacket so that the feed hole is directed into the feeding channel.

3. The aftertreatment device according to claim 1, wherein the feeding channel has a second end, the cross-sectional area of which second end is unequal to the cross-sectional area of the first end.

4. The aftertreatment device according to claim 3, wherein the wall of the feeding channel has at least along a part of its length a conical shape.

5. The aftertreatment device according to claim 3, wherein the cross-sectional area of the first end of the feeding channel is smaller than the cross-sectional area of the second end.

6. The aftertreatment device according to claim 3, wherein the cross-sectional area of the first end of the feeding channel is larger than the cross-sectional area of the second end.

7. The aftertreatment device according to claim 3, wherein the second end of the feeding channel is substantially connected to the first end wall of the casing.

8. The aftertreatment device according to claim 1, wherein the cross-sectional area of the first end of the feeding channel is substantially smaller than the cross-sectional area of the first end of the mixing tube.

9. The aftertreatment device according to claim 1, wherein the first end of the feeding channel extends through to the outlet opening into the mixing tube.

10. The aftertreatment device according to claim 1, wherein the feed hole is located to the first end wall substantially on the imaginary central axis of the feeding channel.

11. The aftertreatment device according to claim 1, wherein it has a swirl structure for guiding the exhaust gas led into the casing to rotate around the feeding channel in one direction of rotation.

12. The aftertreatment device according to claim 11, wherein said swirl structure comprises at least one flow guide for guiding the exhaust gas flowing from the inlet opening to the casing to rotate around the feeding channel.

13. The aftertreatment device according to claim 1, wherein the feeding channel is located in an eccentric manner to the casing and the edge of the inlet opening has a collar for guiding the exhaust gas flow to the widest point of the slot between the outer jacket of the casing and the wall of the feeding channel in the direction of the tangent of the wall of the feeding channel.

14. The aftertreatment device according to claim 1, wherein it further comprises a substrate casing, inside of which an aftertreatment substrate of the exhaust gas is located and which substrate casing has an inlet pipe and an outlet connection, which outlet connection is connected to the inlet opening of the casing.

15. The aftertreatment device according to claim 14, wherein said aftertreatment substrate is a particulate filter or an oxidation catalyst.

* * * * *